March 25, 1969  C. W. LYLE  3,434,333
DEW POINT TEMPERATURE INDICATOR
Filed May 27, 1966
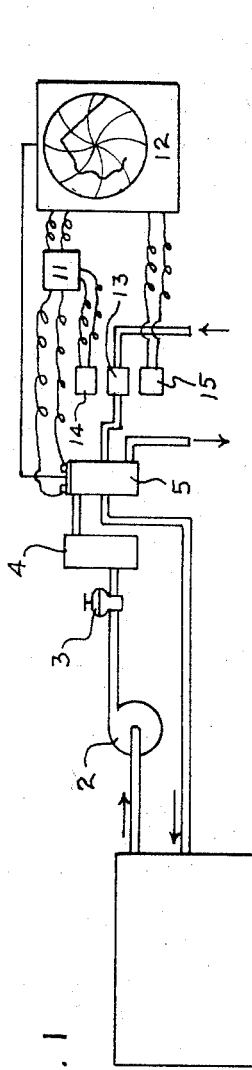
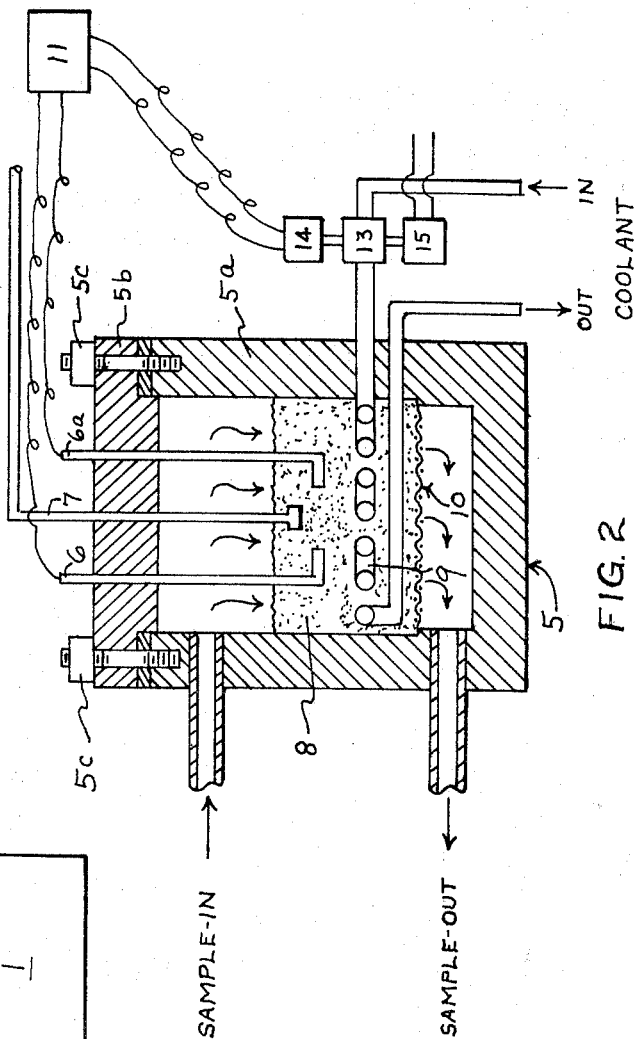
INVENTOR
CHARLES W. LYLE
BY Harry M. Saragovitz,
Edward J. Kelly &
A. J. Dupont
ATTORNEYS 3,434,333
DEW POINT TEMPERATURE INDICATOR
Charles W. Lyle, Rte. 2, Havre de Grace, Md. 21078
Filed May 27, 1966, Ser. No. 554,298
Int. Cl. G01n 25/02
U.S. Cl. 73—17                        13 Claims

ABSTRACT OF THE DISCLOSURE

Apparatus to determine the dew point of a gas, having a container for hygroscopic material, there being controllable cooling means, electrodes and temperature responsive means carried by the container and extending into the hygroscopic material. Means are provided to circulate gas to be tested through the material so that moisture is condensed from the gas into the cooled material which permits current to flow between the electrodes and operate current responsive means connected to the electrodes.

---

The invention described herein may be manufactured and used by or for the Government for governmental purposes, without the payment to me of any royalty thereon.

The present invention relates to a dew point temperature indicator.

Determining the dew point temperature of a gas, such as air, is a necessary step towards determining relative or absolute humidity. And humidity control is a factor in processes like food drying and preservation, textile manufacture, paper production, and gaseous combustion. Relative humidity plays an important role in static electricity control to avoid explosions in explosive plants, flour mills, and the like.

The most common apparatus for dew point determination disclosed by the prior art is a polished metal cup containing a thermometer, a liquid, such as alcohol, and ice. Its operation is simple. The ice is slowly stirred in the liquid reducing the temperature of the combination which is reflected on the thermometer. A sample of the gas tested is blown gently against the polished surface of the cup. When the dew point is attained, a visible film of moisture or frost forms on the polished surface. At that point, the temperature in the cup, read on the thermometer, is the dew point of the gas. Various means for recording the dew point temperature and regulating the gas flow may be connected to the basic apparatus.

In some circumstances, existing dew point indicators have proven inadequate. For example, in a wind tunnel—a common environment for such an instrument—there is an adverse effect on the indicator by contaminants in the air. Oil vapor from air compressor bearings often finds its way into the air stream. Condensing as a film on the polished cup, the oil is indistinguishable, to electric or to human eyes, from a moisture film or frost. And a wiper assembly which automatically cleans the cup between cycles, only compounds the problem—cleaning is not uniform, resulting in variations in dew point temperatures not wholly attributable to changes in the moisture content of the air. A solution to the problem lies in the ability to sense the presence of moisture by means other than electric or human sight.

The gravamen of the subject invention is that dry salt (sodium chloride) does not conduct electricity but wet salt does. Briefly, the device consists of a container of salt or other hygroscopic material in which are embedded a coil for the circulation of coolant, a temperature sensor, and two electrodes. A sample of gas is passed through the salt which is cooled by coolant flowing through the coil. When the temperature of the salt reaches the dew point of the sample gas, condensate forms on the salt which then becomes conductive and permits an electric current to pass between the two electrodes. The completion of that circuit, amplified if necessary, signals the recording of the dew point temperature and, if desired, shuts off the flow of the coolant. As the salt warms, the flow of the gas sample removes the moisture from the salt rendering it nonconductive once again. The cycle can be repeated.

The system is not affected by the presence of contaminants until their concentration attains a magnitude sufficient to prevent the salt from being wetted and becoming conductive. When that happens the salt is replaced.

Accordingly, it is the primary object of the present invention to provide a dew point temperature indicator which does not rely upon electric or human eyesight for its successful operation.

It is another object of the instant invention to provide an indicator capable of accurate determination of the dew point of a vapor.

It is still another object to provide an indicator capable of repeated accurate dew point determinations.

It is a final object of the subject invention to provide a dew point temperature indicator of simple and inexpensive construction for use in conjunction with electric recording means and alternating gas cycling means.

Other objects and advantages of the present invention will be fully apparent from the following description taken in connection with the annexed drawing in which:

FIG. 1 shows a diagrammatic view of a system in which the present invention is incorporated; and FIG. 2 is a vertical enlarged sectional view of the main constituting element of the present invention.

Although illustrated in FIG. 1 in automated form, the instant device need not be so connected. Where only infrequent sampling is required the system can be far simpler. The temperature could be read from a thermometer by an operator who could also open and close the coolant valve. And the instant that the dew point is reached it could be indicated by placing an ohmmeter across the leads from the salt imbedded electrodes. An ohmmeter would reflect the sudden decrease in the resistance of the salt.

In FIG. 1 the gas sample is drawn from source 1 and caused to flow by pump 2 through flow regulator 3 and flow rate meter 4 into insulated condensing chamber generally shown at 5, where it passes through the salt 8 which is held in place by screen 10 and cooled by imbedded cooling coil 9. The housing 5a of the present device has a removable cover 5b held in place by clamps 5c. When the salt is cooled to the dew point temperature of the gas, moisture condenses on it permitting a current to flow between electrodes 6, 6a. At that instant, temperature sensor 7, through amplifier 11, causes the temperature to be recorded on time-temperature recorder 12. Simultaneously, coolant inlet valve 13 is closed by valve closing mechanism 14.

After a suitable interval during which the salt 8 has been warmed and dried by the continued flow of the gas, the time-temperature recorder signals the coolant inlet valve to reopen by means of a valve opening mechanism 15. The cycle is repeated.

While only a preferred form of the invention is shown and described, other forms of the invention are contemplated and numerous changes and modifications may be made therein without departing from the spirit of the invention as set forth in the appended claims.

What is claimed is:

1. A device for determining the dew point of a gas comprising, a container, a mass of hygroscopic material within said container, cooling means carried by said container and imbedded in said material, electrodes mounted on said container and imbedded in said material, current responsive means externally disposed and connected to said electrodes, temperature responsive means mounted in said container and imbedded in said material, and means for circulating said gas through said mass of material, whereby the temperatures of said material is lowered until the water vapor in said gas condenses within said mass of material causing a current to flow between the electrodes.

2. The device set forth in claim 1, including sealing means for the container.

3. The device set forth in claim 2, wherein said sealing means include a removable cover for the container.

4. The device set forth in claim 1, wherein said cooling means consists of coils imbedded in said material and passed through the wall of said container to an externally disposed coolant reservoir.

5. The device set forth in claim 1, wherein the means for circulating said gas is an externally disposed pump which pumps said gas through an orifice in a wall of said container and exhausts said gas through another orifice in another wall of said container.

6. The device set forth in claim 1, wherein said electrodes are two in number and are connected to time-temperature recording means and to means for regulating the flow of said coolant.

7. A device for determining the dew point of a gas comprising, a container, a screen spaced from the bottom of said container, a layer of hygroscopic material within said container supported by said screen, said screen being permeable by said gas but impermeable by said material, cooling means carried by said container and imbedded in said material, electrodes mounted within said container and imbedded in said material, current responsive means externally disposed and connected to said electrodes, temperatures responsive means mounted within said container and imbedded in said material, and means for circulating said gas through said material, whereby the temperature of said material is cooled until said gas condensers on the material causing a current to flow between the electrodes.

8. The device set forth in claim 7, including sealing means for the container.

9. The device set forth in claim 8, wherein said sealing means include a removable cover for the container.

10. The device set forth in claim 7, wherein said cooling means consists of coils imbedded in said material and passed through the wall of said container to an externally disposed coolant reservoir.

11. The device set forth in claim 7, wherein said means for circulating said gas is an externally disposed pump which pumps said gas through an orifice in a wall of said container and exhausts said gas through another orifice in another wall of said container.

12. The device set forth in claim 11, wherein one of said orifices is disposed between said layer of hygroscopic material and the top of said container and the other orifice is disposed between said screen and the bottom of said container.

13. The device set forth in claim 7, wherein said electrodes are two in number and are connected to time-temperature recording means and to means for regulating the flow of said coolant.

References Cited

UNITED STATES PATENTS

| 2,975,638 | 3/1961 | Morrison | 73—336.5 |
| 2,987,918 | 6/1961 | Hanna | 73—336.5 |
| 3,200,636 | 8/1965 | Flumerfelt | 73—29 |

JAMES J. GILL, *Primary Examiner.*

R. S. SALZMAN, *Assistant Examiner.*

U.S. Cl. X.R.

73—27, 29, 336.5